US012801293B2

(12) United States Patent
Alakkat et al.

(10) Patent No.: US 12,801,293 B2
(45) Date of Patent: Nov. 17, 2026

(54) DATA STORAGE DEVICE AND METHOD TO ACCESS LOGICAL BLOCK RANGE

(71) Applicant: Sandisk Technologies, Inc., Milpitas, CA (US)

(72) Inventors: Sajith Alakkat, Bangalore (IN); Rewa Prasad Ahirwar, Bangalore (IN); Vinod Sasidharan, Bangalore (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 120 days.

(21) Appl. No.: 18/916,686

(22) Filed: Oct. 15, 2024

(65) Prior Publication Data

US 2026/0104807 A1 Apr. 16, 2026

(51) Int. Cl.
*G06F 3/06* (2006.01)

(52) U.S. Cl.
CPC ............ *G06F 3/0622* (2013.01); *G06F 3/064* (2013.01); *G06F 3/0679* (2013.01)

(58) Field of Classification Search
CPC ....... G06F 3/0622; G06F 3/064; G06F 3/0679
See application file for complete search history.

(56) References Cited

U.S. PATENT DOCUMENTS 8,566,603 B2 * 10/2013 Cox ........................ G06F 21/80 713/183
2002/0007437 A1 * 1/2002 Chan ....................... G06F 3/062 711/111
2004/0103288 A1 * 5/2004 Ziv ..................... G06F 12/1466 713/185
2006/0064560 A1 * 3/2006 Mizuno ................. G06F 21/805 711/152
2007/0180210 A1 * 8/2007 Thibadeau .............. G06F 21/32 711/163
2010/0161928 A1 * 6/2010 Sela .................... G06F 12/0246 711/163
2012/0284473 A1 * 11/2012 Hsu ..................... G06F 12/1466 711/E12.091
2013/0080787 A1 * 3/2013 Lee ....................... H04L 9/3234 726/16
2013/0212368 A1 * 8/2013 Peng ................... G06F 12/0246 711/E12.008

(Continued)

*Primary Examiner* — Shin-Hon (Eric) Chen
*Assistant Examiner* — Abdullah Almamun
(74) *Attorney, Agent, or Firm* — Dentons Durham Jones Pinegar P.C.

(57) ABSTRACT

A data storage device includes a storage medium to store user data where logical block ranges are associated with the storage medium. The data storage device also includes at least one processor configured to receive ATA security protocol commands from a host device. The security protocol command includes a parameter list, which includes a reserved field used to include a first identifier that, in turn, is associated with a selected first logical block range, which enables identification of the selected first logical block range associated with the ATA security protocol command. The parameter list also includes a first password in a password field of the parameter list. The first password enables access to the first logical block range. The processor verifies the password with an authentication data set to enable one or more functions, such as an unlock function, associated with the selected first logical block range.

20 Claims, 7 Drawing Sheets

(56) References Cited

U.S. PATENT DOCUMENTS

| | | | | |
|---|---|---|---|---|
| 2013/0262795 | A1 * | 10/2013 | Aono | G06F 9/3004 711/155 |
| 2013/0262810 | A1 * | 10/2013 | Chang | G06F 12/0246 711/170 |
| 2013/0332678 | A1 * | 12/2013 | Fitzpatrick | G06F 12/00 711/147 |
| 2020/0250346 | A1 * | 8/2020 | Sasidharan | G06F 21/79 |
| 2022/0327245 | A1 * | 10/2022 | Agrawal | G06F 21/78 |

* cited by examiner

DATA STORAGE DEVICE AND METHOD TO ACCESS LOGICAL BLOCK RANGE

TECHNICAL FIELD

The present disclosure relates to a data storage device and a method of communicating between a data storage device and host device. In some examples, the disclosure relates to authentication and access control of a logical block ranges from a plurality of logical block ranges.

BACKGROUND

In some data storage devices, such as a known self-encrypting drive (SED), the whole logical block address (LBA) range for user data can be available for a user with access to that LBA range. This can be problematic where the data storage device is shared with multiple users as a user who has access to the LBA range can have access to another user's user data.

SUMMARY

There is disclosed a method of a data storage device communicating with a host device, the method comprising receiving, from the host device, an ATA security protocol command. The method further includes determining, from a reserved field in a parameter list of the ATA security protocol command, a first identifier associated with a first logical block range of a plurality of logical block ranges associated with a storage medium. The method also includes determining, from a password field in the parameter list of the ATA security protocol command, a first password. The method also includes verifying the first password with an authentication data set. Responsive to verifying the first password, the method includes selectively enabling one or more functions associated with the first logical block range, and wherein one or more functions associated with at least one other logical block ranges in the plurality of logical block ranges are disabled.

In some examples, the method further includes determining from a security protocol specific field in the ATA security protocol command, the one or more functions.

In some examples of the method, the one or more functions comprises an unlock function to enable reading, writing, modifying, or erasing user data stored in the first logical block range.

In some examples of the method, the authentication data set includes a record associating a plurality of enrolled passwords with a respective plurality of identifiers and/or the plurality of logical block ranges, and wherein verifying the first password further includes verifying both the first password and corresponding first identifier (with the authentication data set.

In some examples, the method further comprises determining, based on a range table associating a plurality of identifiers corresponding to the plurality of logical block ranges, the first logical block range corresponding to the first identifier.

In some examples of the method, the first identifier includes at least one, or more of: a number associated with the first logical block range; a username, or other text, associated with the first logical block range; an alphanumeric associated with the first logical block range; and a representation of the first logical block range.

In some examples of the method, the reserved field in the parameter list of the ATA security protocol command includes: bit 1, bit 2, and bit 3 of byte 0 of the parameter list; or one or more bits in byte 0 of the parameter list; or one or more bits in byte 1 of the parameter list; or bits in both byte 0 and byte 1 of the parameter list.

In some examples of the method, the password field in the parameter list of the ATA security protocol command includes: one or more of bytes 2 to byte 33 of the parameter list.

In some examples, the method further includes determining, from the password field and selection of a master password field in a parameter list of the ATA security protocol command, a master password; verifying the master password with the authentication data set; and responsive to verifying the master password, selectively enabling one or more administrator functions associated with the data storage device.

In some examples of the method, the one or more administrator functions comprises at least one or more of: modifying the authentication data set to associate a new password with an identifier in the plurality of enrolled passwords and the plurality of identifiers; modifying the authentication data set to associate a new master password; configuring a number and/or size of the plurality of logical block ranges; and erasing data stored in one or more of the plurality of logical block ranges.

In some examples the method includes an enrolment mode, wherein the method comprises: receiving, from the host device, a set password ATA security command; determining, from a reserved field of the parameter list in the set password ATA security command, a selected identifier for a selected logical block range; determining, from a password field in the set password ATA security protocol command, a further password; and modifying the authentication data set by associating the selected logical block range or selected identifier with the further password.

In some examples of the method, the ATA security protocol command is in accordance with SAT-5 (SCSI/ATA Translation-5).

There is also disclosed a data storage device comprising: a storage medium configured to store user data, wherein a plurality of logical block ranges are associated with the storage medium; and at least one processor. The at least one processor is configured, individually or in combination, to receive, from a host device, an ATA security protocol command. The at least one processor is also configured to determine, from a reserved field in a parameter list of the ATA security protocol command, a first identifier associated with a first logical block range of the plurality of logical block ranges. The at least one processor is further configured to: determine, from a password field in the parameter list of the ATA security protocol command, a first password. The at least one processor is also configured to verify the first password with an authentication data set. In response to verification of the first password, the at least one processor is configured to selectively enable one or more functions associated with the first logical block range, wherein one or more functions associated with other logical block ranges in the plurality of logical block ranges are disabled.

In some examples of the data storage device, the at least one processor is further configured to determine from a security protocol specific field in the ATA security protocol command, the one or more functions.

In some examples of the data storage device, the one or more functions comprises an unlock function to enable reading, writing, modifying, or erasing user data stored in the first logical block range.

In some examples, the data storage device further comprises a configuration memory configured to store the authentication data set. The authentication data set includes a record to associate a plurality of enrolled passwords with a respective plurality of identifiers and/or the plurality of logical block ranges. The at least one processor is further configured to verify both the first password and corresponding first identifier with the authentication data set.

In some examples, the data storage device further comprises a configuration memory configured to store a range table associating a plurality of identifiers corresponding to the plurality of logical block ranges, wherein the at least one processor is further configured to determine, based on the range table, the first logical block range corresponding to the first identifier.

In some examples of the data storage device, the first identifier includes at least one, or more of: a number associated with the first logical block range; a username, or other text, associated with the first logical block range; an alphanumeric associated with the first logical block range; and a representation of the first logical block range.

In some examples of the data storage device, the reserved field in the parameter list of the ATA security protocol command includes: bit 1, bit 2, and bit 3 of byte 0 of the parameter list; or one or more bits in byte 0 of the parameter list; or one or more bits in byte 1 of the parameter list; or bits in both byte 0 and byte 1 of the parameter list.

There is also disclosed a computing device comprising means for receiving a request to access a first logical block range in a storage medium. The computing device also includes means for determining, based on the request to access the first logical block range, a first identifier associated with the first logical block range. The computing device further includes means for receiving, from a user interface, a first password associated with the first logical block range. The computing device also includes means for sending, to a data storage device, an ATA security protocol command to enable one or more functions associated with a first logical block range, wherein: a reserved field in a parameter list of the ATA security protocol command includes the first identifier associated with the first logical block range; and a password field in the parameter list of the ATA security protocol command includes the first password.

BRIEF DESCRIPTION OF DRAWINGS

FIG. 3(*b*) illustrates a portion of the parameter list of the ATA security protocol command, including use of a reserved field for a first identifier associated with a selected first logical block range;

FIG. 7(*b*) illustrates a user interface generated at the display of the host device to prompt an administrator to select the number of logical block ranges to be divided; and FIG. 7(*c*) illustrates a user interface generated at the display of the host device for a user to set a password for a selected logical block range.

DESCRIPTION OF EMBODIMENTS

Overview

Figure 1:
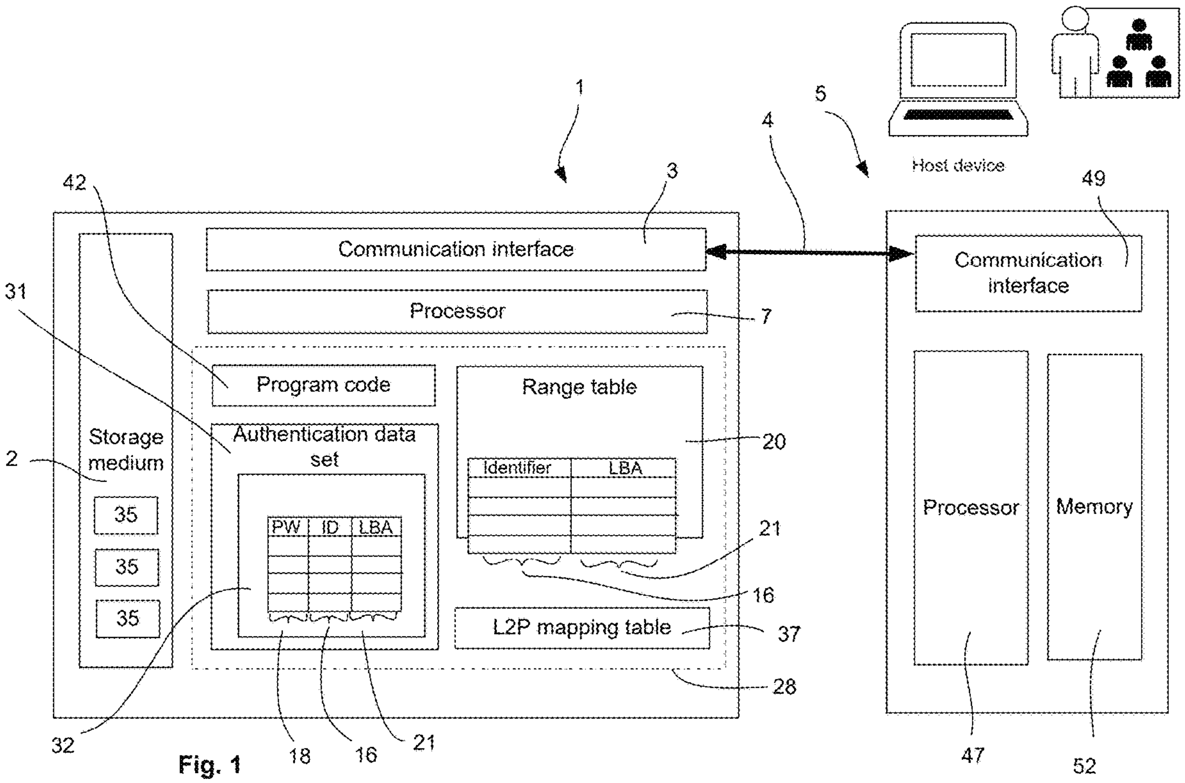
FIG. 1 illustrates a schematic of a host device with a data storage device.

FIG. 1 illustrates a data storage device 1 configured to be in communication with a host device 5. The data storage device 1 includes a storage medium 2 configured to store user data, wherein a plurality of logical block ranges 21 are associated with the storage medium 2. The data storage device 1 also includes a communication interface 3 configured to communicate with the host device 5. The data storage device also comprises at least one processor 7 configured to execute program code 42 stored in a memory 28 to issue commands for controlling operation of the data storage device 1.

Figure 2:
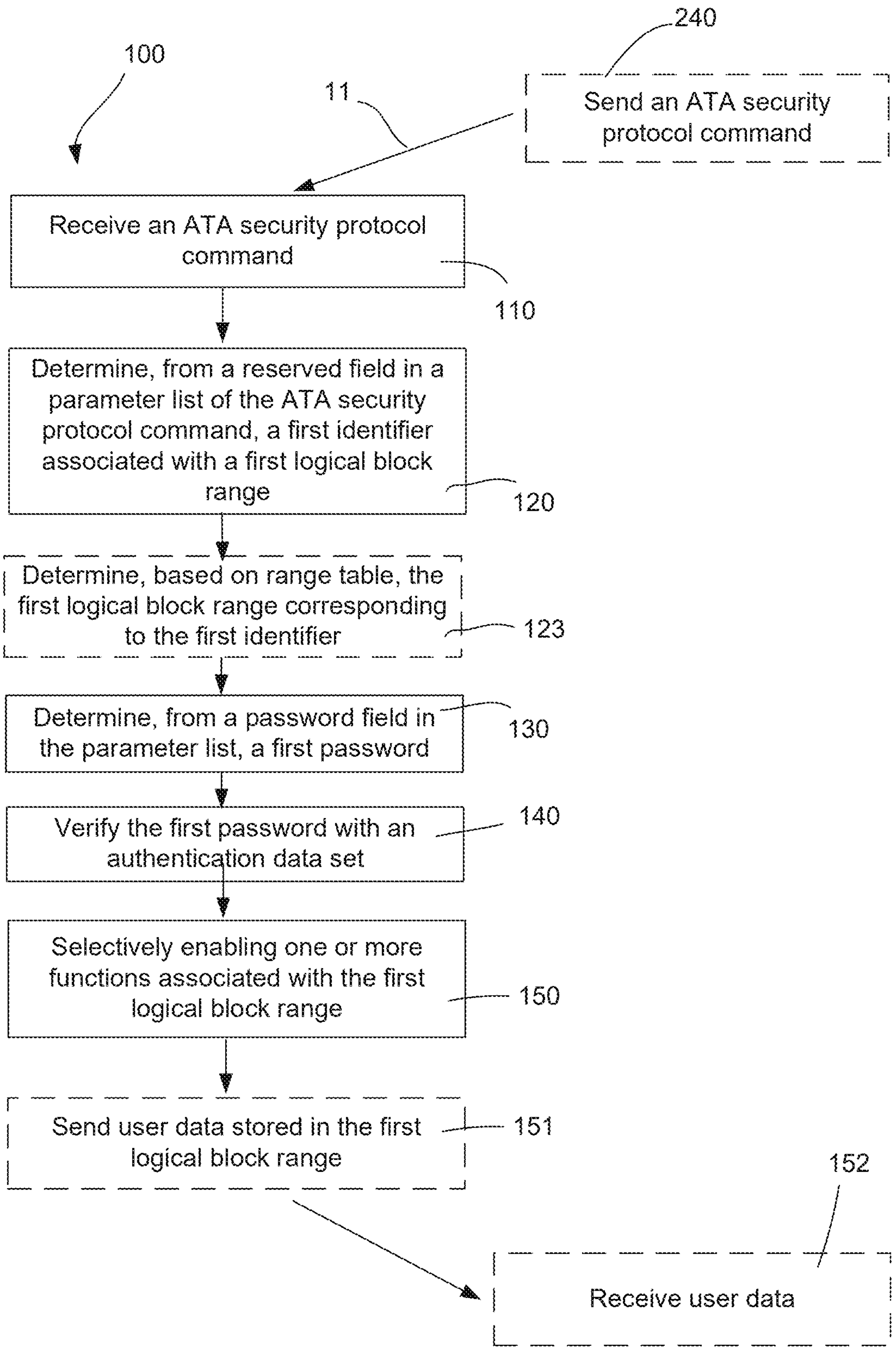
FIG. 2 illustrates a flow diagram of a method of the data storage device and host device communicating with ATA security protocol commands to enable one or more functions in a first logical block range in a plurality of logical block ranges.

The at least one processor 7 is configured, individually or in combination, to perform steps in a method 100, as illustrated in FIG. 2, to enable one or more functions associated with a logical block range of the storage medium 2 and the host device 5. This can include receiving 110, from the host device 5, an ATA security protocol command 11 that is typically sent from the host device 5. The ATA security protocol command 11 includes information specifying a logical block range in the storage medium 2 that a user has selected to use as well as a corresponding password.

The method 100 includes determining 120, from a reserved field 13 in a parameter list 12 of the ATA security protocol command 11, a first identifier 15 associated with a first logical block range 23 of the plurality of logical block ranges. Referring to the example of a parameter list 12 in FIG. 3(*b*), this includes reading the first identifier 15 from the reserve field 13 in byte 0 and byte 1 of the parameter list 12.

Figure 3A:
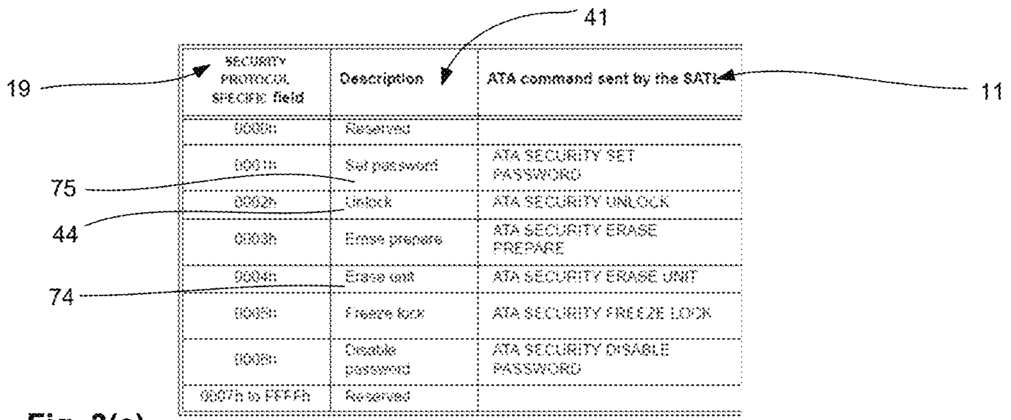
FIG. 3(*a*) is a table listing security protocol fields and associated functions for ATA security protocol commands.
Figure 3B:
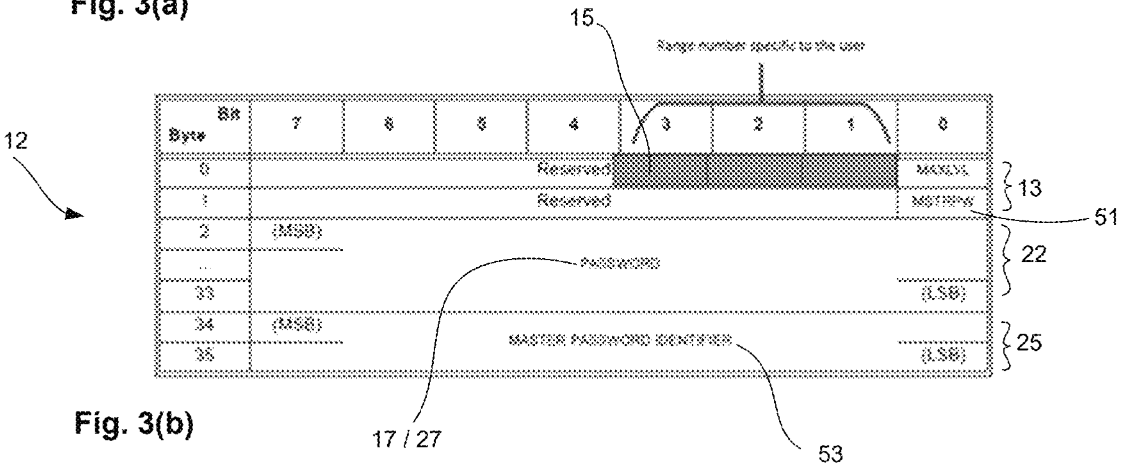

The method 100 also includes determining 130, from a password field 22 in the parameter list 12, a first password 17. Referring to FIG. 3(*b*), this may include the password 17 at bytes two to thirty three.

The method 100 further includes verifying 140 the first password 17 with an authentication data set 31. Referring to FIG. 1, this may include an authentication data set 31 stored in memory 28. In some examples, the authentication data set 31 includes a plurality of enrolled passwords 18. In response to successfully verifying the received password, the method 100 includes selectively enabling 150 one or more functions 41 associated with the first logical block range 23. In some examples, the one or more functions 41 include unlocking the first logical block range 23 to the host device 5 for user data to be read, written, modified, or erased in the first logical block range 23.

In some examples, one or more functions 21 are only enabled when a valid password and respective identifiers for that logical block range are provided in the ATA security protocol command 11. At least one or more of the other logical block ranges in the plurality of logical block ranges 21 are locked when such functions are disabled.

The presently described data storage device 1 and method 100 can enable security of multiple ranges in the data storage device with respective multiple passwords. The device and method enables the physical data storage device 1 to be shared with multiple users whilst each user's data can be secured (and inaccessible by other users) using passwords. Notably, the use of the reserved field 13 to pass information on the selected logical block range enables this to operate on existing, or known, ATA protocols.

Components of a non-limiting example of the data storage device will now be described in detail. It is to be appreciated that alternative examples may include more, or less, features Data Storage Device The data storage device 1, in general, is configured to be used with a host device 5 to store user data. In some examples, the data storage device 1 is a mass storage device that is a peripheral device to a core host device 5. In particular, the data storage device 1 can be in communication with the host device 5 via an ATA communication bus 4.

The data storage device 1 is configured with security features to control access to user data stored in the data storage device 1. In some examples, this includes use of passwords to control access to specified logical block ranges. In some examples, the data storage device includes additional security features, such as a cryptography engine, to encrypt data stored in the storage medium. In some examples, the data storage device 1 is a self-encrypting drive (SED).

In some examples, the data storage device 1 may be mounted within a housing of the host computer.

In other examples, the data storage device 1 may by mounted external of the housing of the host computer. This may include user of eSATA connections.

Communication Interface

The communication interface 3 enables the data storage device 1 to communicate with the ATA communication bus 4 of the host device 5.

In some examples, the data storage device 1 and the host device 5 communicate in accordance with ATA (AT Attachment). In some examples, this includes ATA security protocol commands in accordance with SATA (Serial AT Attachment) protocols.

In some examples, this includes communicating ATA security protocol commands in accordance with SCSI/ATA Translation (SAT), where SCSI is short for Small Computer System Interface and ATA is short for AT Attachment. These include standards developed by the Technical Committee T10, which is a subcommittee of INCITS (InterNational Committee for Information Technology Standards).

In some examples, the ATA security protocol commands is in accordance with SAT. In other examples, the ATA security protocol commands is in accordance with SAT-2. In other examples, the ATA security protocol commands is in accordance with SAT-3. In other examples, the ATA security protocol commands is in accordance with SAT-4.

In further examples, the ATA security protocol commands is in accordance with draft SAT-5.

Storage Medium 2

The storage medium 2 is configured to store user data. This can include a non-volatile storage medium that is non-transitory to retain the stored block data irrespective of access to a power source from a host device 5. The storage medium 2 may be a hard disk drive (HDD) with a rotating magnetic disk or a solid state drive (SSD) and its variations like SLC (Single Level Cell), eMLC (Enterprise Multi Level Cell), MLC (Multi Level Cell), TLC (Triple Level Cell), and QLC (Quadruple Level Cell), and combinations of the above such as SSHD (solid state hybrid drive). Any other type of non-volatile storage media may also be used, including emerging non-volatile memory such as Program in Place or Storage Class Memory (SCM), such as ReRam, PCM, and MRAM. Further, the storage medium 2 may be a block data storage device, such that the user data is written in blocks to the storage medium 2 and read in blocks from the storage medium 2.

In some examples, the storage medium 3 includes flash memory (such as NAND flash). This may include a plurality of blocks 35, where each block is the smallest unit that can be erased. Each block 35 contains a plurality of flash memory units (FMU), where the FMU is the smallest data chunk that the can be used to read or write to the flash memory. Because each block 35 is the smallest unit that can be erased, to erase or modify data in one FMU involves erasing at least an entire block and rewriting the block (or to a new physical block).

The plurality of blocks 35 have physical addresses associated with the blocks. As discussed herein, logical block addresses (which are used at the host device side) will need to be mapped to these physical addresses. This can be facilitated with the logical to physical (L2P) mapping table 37.

Since data corresponding to different users are stored in the storage medium, the data corresponding to different users may be logically separated. This can include the storage medium 2 to be configured to store user data of an enrolled user in a first logical block addressing (LBA) range 23 as well as other user data of other enrolled users in another corresponding LBA range in the plurality of logical block ranges 21 (i.e. multiple logical block ranges).

Processor 7

The at least one processor 7 is associated with configuration memory 28 storing software to implement the method described herein. A processor may comprise one or more of microprocessors, microcontrollers, controlling circuitry, or a combination thereof. The one or more processors are, in combination or individually, configured to execute program code stored within the memory 28 to issue commands for controlling the operation of the data storage device 1.

The at least one processor 7 is configured to perform functions associated with access control, including verifying passwords of a user from the host device and, in response to verification, selectively enabling functions with corresponding logical block ranges for that user.

In one example, the at least one processor 7 may include a reduced instruction set computer (RISC). In one example, the at least one processor 7 is a Cortex M0 microcontroller from ARM Limited.

Configuration Memory 28

Configuration memory 28 stores data related to configuration of the data storage device 1. This may include data related to access control (including authentication data set), other data related to enrolled users, range table 20, L2P mapping table 37, settings, and other configuration parameters and metadata used for operation of the data storage device 1. It may also include data related to usage and health of the storage medium, age of data stored in the storage medium, and other parameters.

The configuration memory 28 can also store firmware and/or software such as program code 42 for operation of the method and the at least one processor 7.

It is to be appreciated that the storage medium 2 may also be configured as a non-volatile data storage for firmware, software, mapping tables 37, authentication data set 31, and other metadata. This can include data that would be loaded to RAM (random access memory) used by the processor 7 during an operating session. This enable preservation of metadata when the data storage 1 is unpowered and not in use.

Authentication Data Set

The authentication data set 31 includes a record 32 of a plurality of enrolled passwords 18. These passwords 18 are associated with a respective logical block ranges 21. In some examples, each password 18 may be associated with an identifier 16 that, in turn, is associated with a respective logical block range 21.

Referring to the example in FIG. 1, the record 32 may include a data set where each pair of identifier 15 and password 17 (of the plurality of identifiers 15 and plurality of enrolled passwords 18) are associated with a logical block range 23.

illustrates another representation of the authentication data set and association with the storage medium. This includes an encrypted configuration file as a record 32 including a password digest of the plurality of enrolled passwords 18. The enrolled passwords 18 are, in turn, associated with records in a range table 20.

Range Table

The range table 20 includes an association of a plurality of identifiers 16 with corresponding plurality of logical block ranges 21. In the example illustrated in FIG. 4, the identifiers 16 include (or are associated with) a start address for each corresponding logical block range. This is shown as "0", "10 GB", "20 GB", etc. This range table also includes the length of the range, which in this case is divided evenly to 10 GB for each logical block range. Thus it is possible to determine 123, based on the range table, the logical block ranges 23 corresponding to the received identifier.

In some examples the identifiers, such as the first identifier 15, may include the start address. For example, a start address of "0". As the range table 20 also specifies length of that block, this can be used to derive the first logical block range 23.

Figure 5:
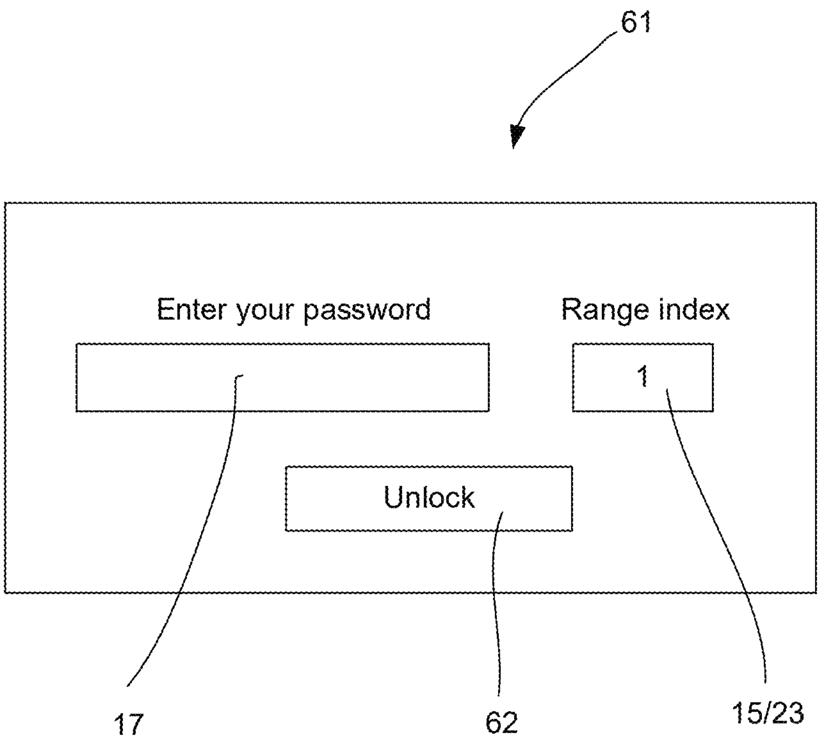
FIG. 5 illustrates a user interface generated at a display of the host device to prompt a user to enter a password and an identifier for a selected logical block range.

In other examples, each of the plurality of identifier 16 may include a range index number (see FIG. 5). For example, sequential numbers such as "1", "2", "3". In other examples, the plurality of identifiers may include other numbers (e.g. hexadecimal numbers), text, alphanumeric, etc.

Figure 4:
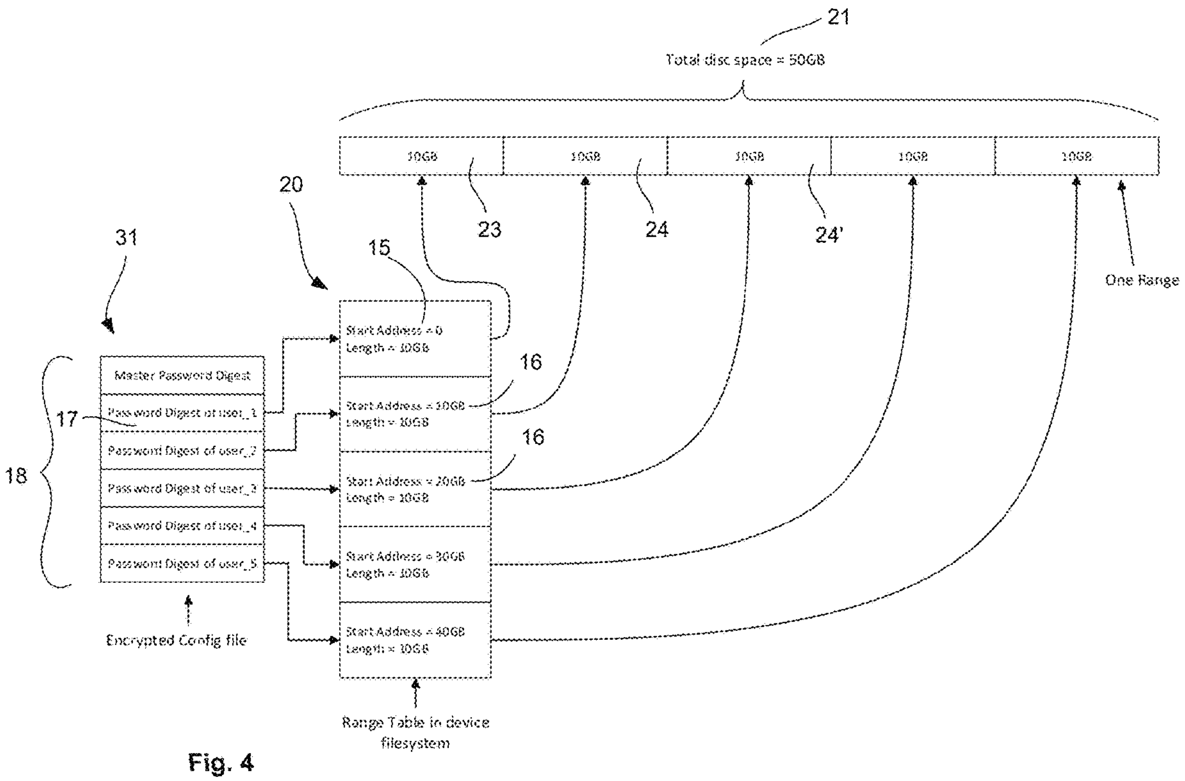
FIG. 4 is a representation of the association between enrolled passwords, specified logical block range, and identifiers of the logical block range(s)

In FIG. 4, there storage medium 2 is divided into five logical block ranges of 10 GB each. Each logical block range has an associated password 17 of the enrolled user and an identifier 15 (in the form of a start address). In this example, a block length is provided for each block. However, it is to be appreciated that in some examples specifying a block length for each block is not required for alternatives where the block length is known (and the same) for all blocks.

Logical to Physical Mapping Table

A logical to physical (L2P) mapping table 37 can be used to map the logical location of user data to the physical location of the user data in the storage medium 2.

In some examples, where the storage medium includes flash memory, a flash translation layer (FTL) module is configured to user the L2P mapping table 37 to map logical block addresses to physical addresses and enable read, write, erase, of the physical blocks.

The FTL module may be implemented by the at least one processor 7 or by a separate hardware module.

Although the range table 20 and the L2P mapping table 37 are shown separately in FIG. 1, it is to be appreciated that in other examples these two tables could be combined as one table or dataset.

Host Device

The host device 5 can be a computer system, computer, laptop, tablet, smartphone, etc. In some examples, the host device 5 may include a networked computer system and may include, in part, a server. In some examples, the host device 2 can include other electronic devices that is configured to host a data storage device 1. For example, a gaming console, a smart television, a security camera system, other data recording device, etc. This may be useful for cases where information needs be written and/or accessed securely based on the respective enrolled user 9.

The host device 5 may issue requests to access the data storage device 1 to enable user data to be read, stored, modified, and/or erased in the storage medium.

The host device 5 includes at least one processor 47 and at least one memory 52. The processor 47 is configured to execute instructions from firmware and software stored in the memory 52. A communication interface 49 enables communication with peripherals, which can include the data storage device 1. In some examples, this includes an ATA bus.

When the host device 5 is used with the data storage device 1 for a session, the user provides credentials (such as a password and identifier) to enable access to the storage medium. This can include entering such details via a user interface of the host device 5.

To enable this process, some examples include use of additional software, such as a driver, to enable these functions (as will be discussed below). In some examples, the additional software may be used during enrolment and administrative changes with the data storage device 1.

Thus memory 52 may also store software to facilitate access to one or more block ranges of the data storage device 1. This can include software to perform the computer-implemented method 200 described in further detail below.

Method of Establishing Communication

Examples of using the data storage device 1 will now be described. The data storage device 1 is configured to enable usage by multiple users. This can include multiple users, which during respective separate sessions, use the same host device 5 and data storage device 1. That is, the users share the physical devices but use them at separate times.

In other examples, the data storage device 1 may be shared by users using separate respective host devices 2. This may involve disconnecting the data storage device 1 connecting the data storage device 1 with another host device.

In other examples, a single user may be using the host device 5 and data storage device 1 but needs to store user data securely in different respective logical areas of the storage medium. This may include circumstances where a user has different projects for different clients, and it is a requirement that data between the projects/clients need to be securely stored in separate logical ranges.

Method

Method 100, 200 performed at the data storage device 1 and the host device 5 to enable selective access will now be described.

Unlocking the Data Storage Device and a Logical Block Range

When an enrolled user begins a session, this typically commences with the user providing credentials via a graphical user interface 61 of the host device 5. The graphical user interface 1 may be generated, at least in part, by software executed on the host device 5 for the computer-implemented method 200 (illustrated in FIG. 6).

Referring to FIG. 5, this shows a user interface generated at a display of the host device to prompt the user to enter a password 17 and the logical block range (or identifier of the logical block range) that the user wants to access for the session.

Figure 6:
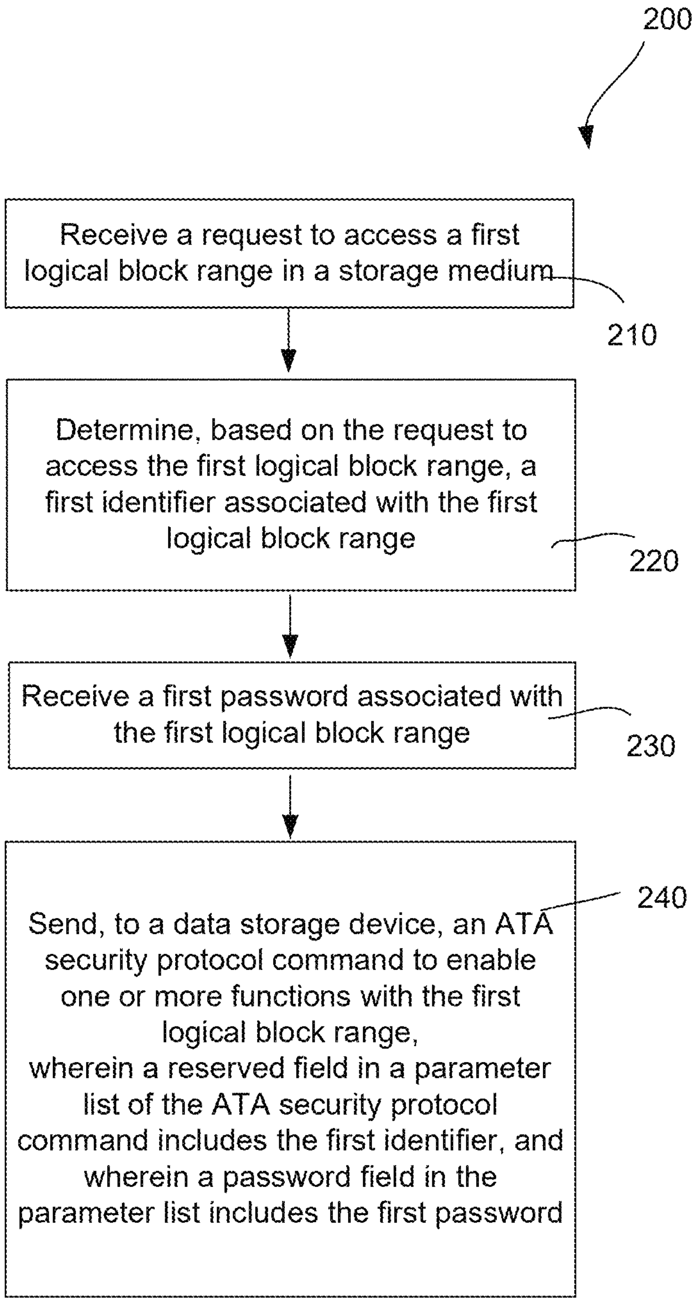
FIG. 6 illustrates a flow diagram of a method performed by the host device to request access to a selected first logical block range from a plurality of logical block ranges.

With the first password 17 and the first identifier/logical block range entered into the graphical user interface 61, the user can select the unlock icon 62 to send a request to unlock the selected first logical block range 23. Referring to FIG. 6, the at least one processor 47 of the host device 5 receives 210 the request to access the first logical block range 23 in the storage medium 2. The method also includes determining 220, based on the request to access the logical block range 23, a first identifier 15 associated with the first logical block range 23.

In some examples, the user may enter the logical block range that can be interpreted by the data storage device 1. In other examples, the specified logical block range be represented by a first identifier 15 (that is easier to remember and recognize by the user). Thus the host device may include a mapping table that maps the entered logical block range with respective first identifiers that can be interpreted by the data storage device.

In other examples, the user enters the first identifier 15 into the graphical user interface and this first identifier 15 is in a form that can be passed to, and interpreted, at the data storage device 1.

The host device 1 is further configured to receive 230 the first password 17 from the user interface 6, 61.

The host device 5 is configured to form an ATA security protocol command 11 to enable one or more functions associated with the logical block range 23. The ATA security protocol command 11 includes a parameter list 12, an example of which is illustrated in FIG. 3(*b*). This includes inserting the first identifier 15 associated with the selected first logical block range 23 into a reserve field 13 in the parameter list 12. The first password 17 is included in the password field 22 of the parameter list 12.

The method 200 includes the host device 5 sending 240 the ATA security protocol command 11 to the data storage device 1 to enable one or more functions with the first logical block range 23. In particular, to unlock the first logical block range for the user to send, receive, and write user data in the first logical block range 23.

Method of Unlocking the Data Storage Device 100

Referring to FIG. 2, the data storage device 1 receives 110 the ATA security protocol command 11 for the method 100. The ATA security protocol command 11 can include a security protocol specific field 19. As illustrated in FIG. 3(*a*) the security protocol specific field 19 can be associated with a function 41, that can include the unlock function 44. The ATA security protocol command 11 can also include a parameter list 12 as shown in FIG. 3(*b*).

Determine a First Identifier 15

The method 100 includes determining 120, from the reserved field 13 in the parameter list 12, a first identifier 15. This first identifier 15 is associated with the first logical block range 23 that the user is selectively unlocking. The method 100 may include further steps to determine additional details of the first logical block range 23. In some examples, the first identifier 15 includes a representation of the first logical block range. In other examples, the first identifier 15 includes a number (such as "1", "2", etc.) associated with the logical block range 23. In other examples the first identifier 15 may include a username, or other text, associated with the first logical block range 23. In yet another example, the first identifier 15 may include an alphanumeric associated with the first logical block range 23.

The first identifier 15 may be mapped to the respective logical block range 23 in a range table 20. As noted above, the range table associates a plurality of identifiers 16 corresponding to the plurality of logical block ranges 21. Thus the method 100 may further include determining 123, based on the range table 20, the first logical block range 23 corresponding to the first identifier 15.

Turning to FIG. 3(*b*), the reserved field 13 in the parameter list 12 of the ATA security protocol command 11 may include a reserved field defined in SAT-5 (SCSI/ATA Translation-5).

In some examples, the reserved field 13 includes bit 1, bit 2, bit 3 of byte 0 of the parameter list 12 as illustrated in FIG. 3(*b*).

In other examples, the reserved field 13 includes one or more bits in byte 0 of the parameter list 12.

In other examples the reserved field 13 includes one or more bits in byte 1 of the parameter list 12.

In yet another example, the reserved field 13 includes bits in both byte 0 and byte 1 of the parameter list 12.

Determine a First Password 17

Referring to FIGS. 2 and 3(*b*), the method 100 further includes determining 130, from a password field 22 in the parameter list 12, a first password 17. The password field 22 is typically reserved for user passwords in ATA security protocol commands 11. Referring to FIG. 3(*b*), in some examples the password field 22 includes one or more of bytes 2 to byte 33 of the parameter list 12.

In instances where a master password is used, which is typically for an administrator or manufacturer to use, this may be included setting the value of a master password field 51 to indicate use of a master password. In some examples, setting the master password field 51 can include setting MSTRPW bit 51 (as shown in FIG. 3(*b*)) to "1" and providing the actual master password 27 in the password field 22.

Verify Password

The method 100 includes verifying the password(s), such as the first password 17 determined from the password field 22. This includes verifying the password(s) with the authentication data set 31 at the data storage device 1. As noted above, the authentication data set 31 can include a record 32 that associates a plurality of enrolled passwords 18 with a respective plurality of identifiers 16. That is, each of the identifiers 16 (that each corresponds to a logical block range) has a password to unlock that logical block range. Alternatively, or in conjunction, each of the plurality of logical block ranges 21 can be directly associated with a respective password.

In some examples, the method includes verifying both the first password 17 and corresponding first identifier 15 (determined from the parameter list 12) with the authentication data set 31. This can be important in case, for example, two passwords in the plurality of enrolled passwords 18 are identical. Thus the data storage device 1 can also verify the first identifier 15 to enable the correct logical block range to be unlocked and accessible.

Selectively Enabling One or More Functions

Responsive to verifying the received first password (such as the first password 17 matching one of the enrolled passwords 18), the method 100 includes selectively enabling 150 one or more functions 41 associated with the selected logical block range 23.

While the method 100 enables functions with the selected logical block range (such as the first logical block range), the other logical block ranges 24 in the plurality of logical block ranges 21 have one or more functions disabled. That is, user data cannot be sent or received from those other logical block ranges 24 (unless respective passwords and first identifiers are provided). In some examples, simultaneous access to more than one of the logical block ranges is prevented. This can include configuring the data storage device so that only one logical block range can be unlocked.

In some examples, the method includes determining from the security protocol specific field 19 in the ATA security protocol command 11, one or more functions 41.

Referring to FIG. 3(*a*), this can include unlocking 44 the data storage device 1. In a specific example, selectively enabling 150 one or more functions 41 includes unlocking the logical block range 23. This can enable user data to be read from the logical block range 23 as illustrated in FIG. 2 where user data stored in the first logical block range is sent 151 from the data storage device 1 and received 152 at the host device 5. In further examples, unlocking the logical block range further enables user data to be written to the logical block range, modified in the logical block range 23, and erased from the logical block range 23.

FIG. 3(*a*) also noted other functions that may be specified in the security protocol specific field 19, including setting passwords, locking the drive, erasing the data storage device, etc.

Administrator Functions

Figure 7A:
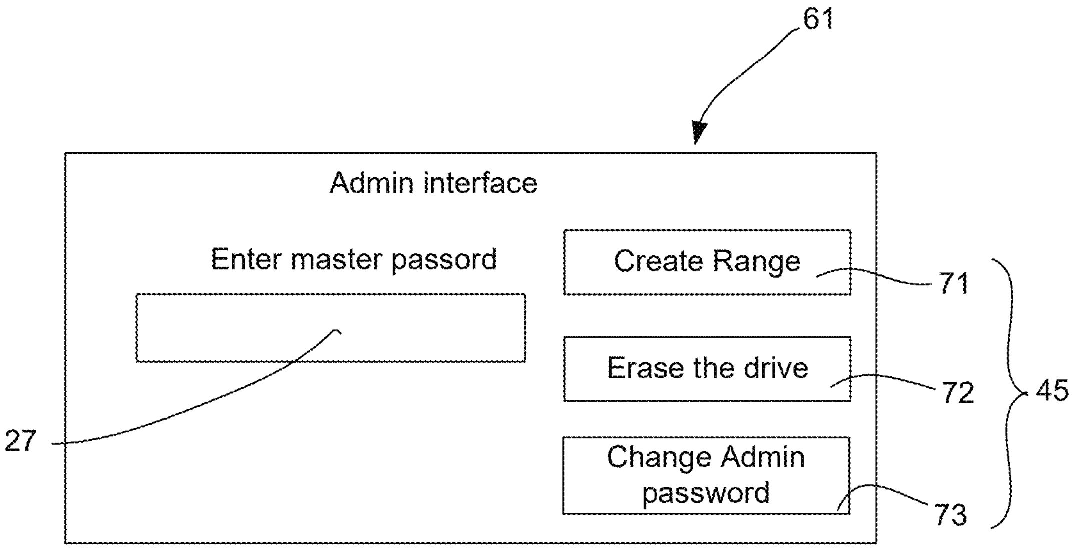
FIG. 7(*a*) illustrates a user interface generated at the display of the host device to prompt an administrator to enter a master password and to select an administrator function.
Figure 7B:
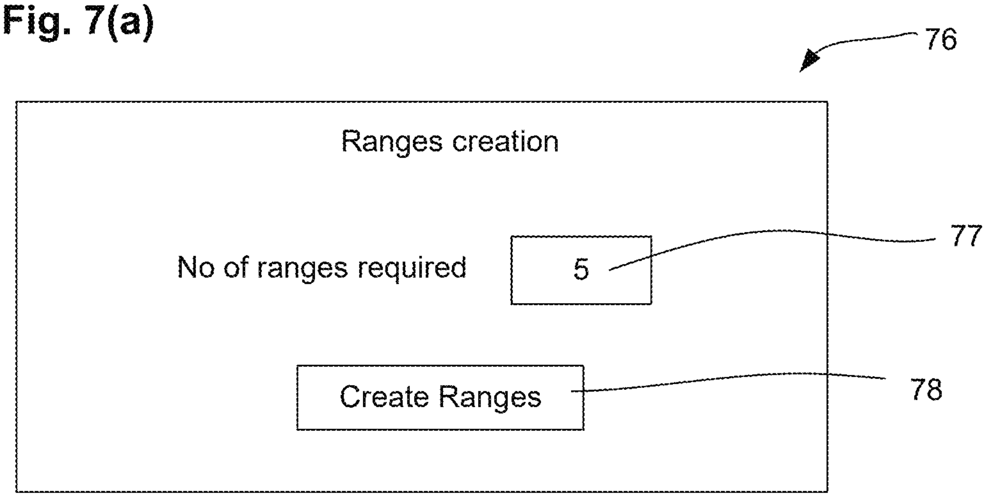
Figure 7C:
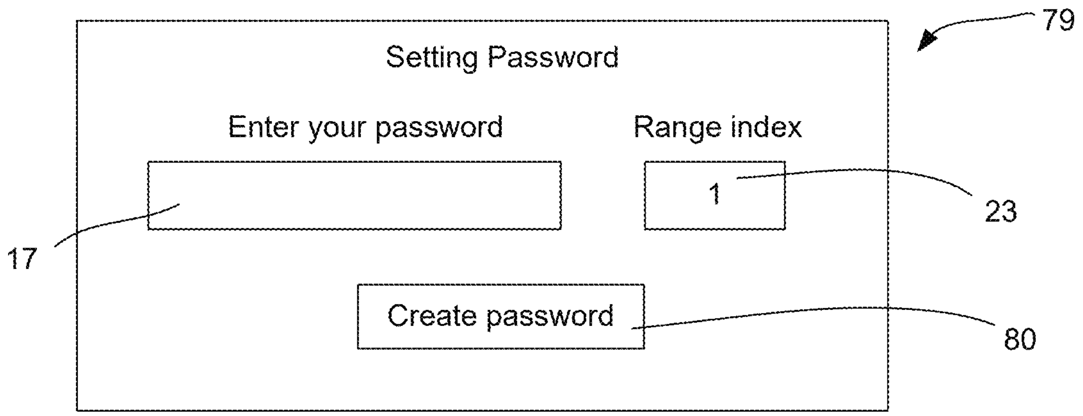

Examples of enrolment of users and their passwords and other administrator functions 45 will now be described with reference to FIG. 7(*a*) to 7(*b*). FIG. 7(*a*) shows another graphical user interface 61 of the host device 5 that is generated, at least in part, by software executed on the host device 5.

This graphical user interface 61 includes a box to enter the master password 27 (also referred herein as the administrator password) to authenticate the administrator and to enable the administrator functions. The graphical user interface 61 also includes a create range icon 71 to initiate the enrolment process discussed below. An erase the drive icon 72 can be selected to erase the storage medium in the data storage device 1. In this example, although the administrator does not have rights to read or write user data in the logical block address ranges of the users, the administrator can erase the user data. This can include formatting the storage device so that the previously defined logical block ranges enrolled users are removed.

A change master password icon 73 enables the master password 27 to be changed. It is to be appreciated that the data storage device 1 may have a factory configured master password in the authentication data set 31. In some examples, this factory set master password may be generic. In other examples, the factory set master password may be obfuscated and shipped with the data storage device (or provided separately to the administrator). Once received by the administrator, the administrator can change the master password for security reasons. This involves modifying the authentication data set to associate a new master password.

A master password identifier 53 may be associated with a master password 27 to enable identification of a master password without disclosing the password itself. This can be useful, for example, if multiple master passwords are used in the system and the master password identifier 53 can be used to identify a particular master password that could further be mapped to the associated functions and privileges. The master password identifier 53 may be provided in the master password identifier field 25 (which in this example is in byte 34 and 35 of the parameter list 12 as illustrated in FIG. 3(*b*)).

Thus in this example, there are three administrator function: (i) enrolment including setting password 75 and range creation; (ii) erasing 74 user data in the data storage device; (iii) and changing the master password.

In response to receiving, via the graphical user interface 61, valid requests for administrator functions 45, an ATA security protocol command 11 is formed that includes a parameter list 12 with a master password 27. This is achieved by including the master password 27 in the password field 22 and setting the master password field bit 51 in the parameter list 12 as illustrated in FIG. 3(*b*). The ATA security protocol command 11 will also have a security protocol specific field 19 that specifies an administrator function 45, such as enrolment/set password 75, and erase unit 74.

The ATA security protocol command 11 is sent from the host device 5 and received at the data storage device 1. At the data storage device 1, the method 100 includes determining the master password in the parameter list 12 of the ATA security protocol command 11. This can include verifying that the master password bit 51 is set and obtaining the master password 27 from the password field 22. The method 100 include verifying that the received master password 27 matches the record in the authentication data set 31. In response to verifying the master password 27, the method 100 includes selectively enabling on or more of the administrator functions 45 (such as those specified in the security protocol specific field 19).

Enrolment and Range Creation

An example of the administrator function 41 of enrolling users and their passwords as well as setting up the number of logical block ranges will now be described with reference to FIGS. 7(*b*) and 7(*c*).

After selection of icon create range icon 71 along with a valid master password, a range creation user interface 76 is presented at the host device 5. In this example, the method include creating logical block ranges that are substantially the same size. A field is provided to enable the number of ranges 77 (which in the illustrated case is five ranges). This will divide the available storage space to five logical block ranges of the same size. A confirmation icon 78 enables the administrator to confirm the number of ranges. Referring to FIG. 4, the present example includes storage medium with 50 GB of available storage space and selection of five ranges divided evenly results in five logical block ranges that each have 10 GB. If the administrator selected two ranges, then there will be two logical block ranges that each have 25 GB.

It is to be appreciated that in alternative examples, the logical block ranges can be configured to have different sizes and numbers. That is some logical block ranges that are of different sizes compared to other logical block ranges.

After creation of the number of ranges, the graphical user interface 79 transitions to enable setting passwords for the created logical block ranges. This is where user(s) can enroll their passwords and associate them with a corresponding logical block range.

At FIG. 7(*c*), a user can provide their password 17 in a box for the selected logical block range (which in this example is the first logical block range 23). A confirmation icon 80 can be selected to create the association of the provided first password 17 with the first logical block range 23.

In response, an ATA security protocol command 11 is formed and sent to the data storage device 1 to set the new password for the logical block range in the authentication data set 31. Alternatively, in the case an existing password has been associated with that logical block range, modifying the authentication data set to associate the new password with the identifier/logical block range. It is to be appreciated that when modifying the password, the previous enrolled password is provided to enable that modification function.

Thus in the enrolment mode, the received ATA security protocol command 11 may include a set password ATA security command 75 as specified in the security protocol specific field 19. The method 100 includes determining the new (or further) password from a password field 15 in the parameter list 12 of the set password ATA security protocol command 75. The method also includes determining a selected logical block range associated with the password change. This can include determining from a selected identifier provided in the reserved field 13 of the parameter list 12 of the set passwords ATA security protocol command 75.

In response, the enrolment process includes modifying the authentication data set 31 by associating the selected logical block range and/or selected identifier with the further password.

Erase Functions

As noted above, in some examples the administrator can perform a global erase and format the data storage device 1.

Furthermore, in some examples individual users can also erase data in their respective logical block ranges. This can include ATA security protocol commands such as erase prepare and erase unit command (see FIG. 3(*a*)). Similar to other commands described above, the parameter list 12 of such ATA security protocol commands can include identifiers in the reserved field to specify the logical block range that should be affected by the command. The respective passwords are also included in the password fields 22 of the parameter list to enable verification before these commands are implemented at the data storage device 1.

Advantages

An advantage of the present invention is to enable secure selection and access of logical block ranges amongst multiple logical block ranges. In particular, this can use existing ATA security protocol commands. This can also include ATA security protocol commands of SAT-5.

This is achieved by utilizing reserved fields in the parameter lists of the ATA security protocol commands. The reserved fields carry information (such as an identifier) associated with the selected logical block range that needs to be accessed.

Once the data storage is unlocked with the corresponding password to enable access to the selected logical block range, the data storage device may be used like any other ATA drive. The disclosed method and data storage device may avoid other bulky, memory-intensive and complex protocols. Such other systems include TCG (Trusted Computing Group)-Opal Security Subsystem Class (SSC) protocols for multi-range support.

Since each logical block range is associated with respective passwords, the data storage device can be shared with multiple user without sharing one user's data with another user's data.

Variations

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method, comprising:

receiving, from a host device, an AT Attachment (ATA) security protocol command, the ATA security protocol command including a parameter list;

determining, from a reserved field in the parameter list of the ATA security protocol command, a first identifier associated with a first logical block range of a plurality of logical block ranges associated with a storage medium, wherein the reserved field is distinct from a password field in the parameter list;

determining, from the password field in the parameter list of the ATA security protocol command, a first password;

verifying the first password with an authentication data set; and responsive to verifying the first password, selectively enabling one or more functions associated with the first logical block range, wherein one or more functions associated with at least one other logical block range in the plurality of logical block ranges are disabled.

2. The method of claim 1, further comprising determining from a security protocol specific field in the ATA security protocol command, the one or more functions.

3. The method of claim 1, wherein the one or more functions comprises an unlock function to enable one or more of reading, writing, modifying, and erasing user data stored in the first logical block range.

4. The method of claim 1, wherein the authentication data set includes a record that associates one or more of a plurality of enrolled passwords with a respective plurality of identifiers and the plurality of logical block ranges, and wherein verifying the first password includes verifying both the first password and corresponding first identifier with the authentication data set.

5. The method of claim 4, further comprising:

determining, from the password field and selection of a master password field in a parameter list of the ATA security protocol command, a master password;

verifying the master password with the authentication data set; and responsive to verifying the master password, selectively enabling one or more administrator functions associated with the data storage device.

6. The method of claim 5, wherein the one or more administrator functions comprises one or more of:

modifying the authentication data set to associate a new password with an identifier in the plurality of enrolled passwords and the plurality of identifiers;

modifying the authentication data set to associate a new master password;

configuring a number and/or size of the plurality of logical block ranges; and erasing data stored in one or more of the plurality of logical block ranges.

7. The method of claim 1, further comprising determining based, at least in part, on a range table associating a plurality of identifiers corresponding to the plurality of logical block ranges, the first logical block range corresponding to the first identifier.

8. The method of claim 7, wherein the first identifier includes one or more of:

a number associated with the first logical block range;

a username, or other text, associated with the first logical block range;

an alphanumeric associated with the first logical block range; and a representation of the first logical block range.

9. The method of claim 1, wherein the reserved field in the parameter list of the ATA security protocol command includes one or more of:

bit 1, bit 2, and bit 3 of byte 0 of the parameter list;

one or more bits in byte 0 of the parameter list;

one or more bits in byte 1 of the parameter list; and bits in both byte 0 and byte 1 of the parameter list.

10. The method of claim 1, wherein the password field in the parameter list of the ATA security protocol command includes one or more of bytes 2 to byte 33 of the parameter list.

11. The method of claim 1, further comprising:

receiving, from the host device, a set password ATA security command;

determining, from a reserved field of the parameter list in the set password ATA security command, a selected identifier for a selected logical block range;

determining, from a password field in the set password ATA security protocol command, a further password; and modifying the authentication data set by associating the selected logical block range or selected identifier with the further password.

12. The method of claim 1, wherein the ATA security protocol command is in accordance with SAT-5 (SCSI/ATA Translation-5).

13. A data storage device, comprising:

a storage medium configured to store user data, wherein a plurality of logical block ranges are associated with the storage medium;

at least one processor configured, individually or in combination, to:

receive, from a host device, an AT Attachment (ATA) security protocol command, the ATA security protocol command including a parameter list;

determine, from a reserved field in the parameter list of the ATA security protocol command, a first identifier associated with a first logical block range of the plurality of logical block ranges, wherein the reserved field is distinct from a password field in the parameter list;

determine, from the password field in the parameter list of the ATA security protocol command, a first password;

verify the first password with an authentication data set; and in response to verification of the first password, selectively enable one or more functions associated with the first logical block range, wherein one or more functions associated with other logical block ranges in the plurality of logical block ranges are disabled.

14. The data storage device of claim 13, wherein the at least one processor is further configured, individually or in combination, to:

determine, from a security protocol specific field in the ATA security protocol command, the one or more functions.

15. The data storage device of claim 13, wherein the one or more functions comprises an unlock function to enable one or more of reading, writing, modifying, and erasing user data stored in the first logical block range.

16. The data storage device of claim 13, further comprising a configuration memory configured to store the authentication data set, wherein the authentication data set includes a record to associate one or more of a plurality of enrolled passwords with a respective plurality of identifiers and the plurality of logical block ranges, and wherein the at least one processor verifies both the first password and corresponding first identifier with the authentication data set.

17. The data storage device of claim 13, further comprising a configuration memory configured to store a range table associating a plurality of identifiers corresponding to the plurality of logical block ranges, wherein the at least one processor is further configured to determine, based on the range table, the first logical block range corresponding to the first identifier.

18. The data storage device of claim 17, wherein the first identifier includes one or more of:

a number associated with the first logical block range;

a username, or other text, associated with the first logical block range;

an alphanumeric associated with the first logical block range; and a representation of the first logical block range.

19. The data storage device of claim 13, wherein the reserved field in the parameter list of the ATA security protocol command includes one or more of:

bit 1, bit 2, and bit 3 of byte 0 of the parameter list;

one or more bits in byte 0 of the parameter list;

one or more bits in byte 1 of the parameter list; and bits in both byte 0 and byte 1 of the parameter list.

20. A computing device, comprising:

means for receiving a request to access a first logical block range in a storage medium;

means for determining, based on the request to access the first logical block range, a first identifier associated with the first logical block range;

means for receiving, from a user interface, a first password associated with the first logical block range; and means for sending, to a data storage device, an AT Attachment (ATA) security protocol command to enable one or more functions associated with the first logical block range, the ATA security protocol command including a parameter list, wherein:

a reserved field in the parameter list of the ATA security protocol command includes the first identifier associated with the first logical block range, the reserved field being distinct from a password field in the parameter list; and the password field in the parameter list of the ATA security protocol command includes the first password.

* * * * *